United States Patent [19]

Juengel

[11] Patent Number: 4,779,319
[45] Date of Patent: Oct. 25, 1988

[54] METHOD AND APPARATUS FOR PERFORMING WORKPIECE INSPECTION WITH A PROBE

[75] Inventor: Richard O. Juengel, Romeo, Mich.

[73] Assignee: GTE Valeron Corporation, Troy, Mich.

[21] Appl. No.: 27,112

[22] Filed: Mar. 13, 1987

Related U.S. Application Data

[63] Continuation of Ser. No. 504,137, Jun. 14, 1983, abandoned, which is a continuation-in-part of Ser. No. 414,734, Sep. 3, 1982, Pat. No. 4,545,106, and Ser. No. 478,906, Mar. 25, 1983, Pat. No. 4,578,874, which is a continuation-in-part of Ser. No. 259,257, Apr. 30, 1981, Pat. No. 4,401,945, said Ser. No. 414,734, is a continuation-in-part of Ser. No. 259,257.

[51] Int. Cl.⁴ .................. B23Q 15/00; G01B 7/02
[52] U.S. Cl. .......................................... 29/57; 33/558;
340/686; 408/16; 409/133; 455/603
[58] Field of Search ............. 33/558, 555, 556, 174 L, 33/143 L, 172 E; 340/652, 686, 539; 29/33 R, 563, 57, 557, 558; 409/126, 127, 133; 408/8, 16; 455/603

[56] References Cited

U.S. PATENT DOCUMENTS

| Re. 30,975 | 6/1982 | Stobbe et al. | 33/174 |
|---|---|---|---|
| 3,488,586 | 6/1970 | Watrous et al. | 321/96 |
| 3,670,243 | 6/1972 | Fougere | 324/57 |
| 3,783,340 | 1/1974 | Becker | 361/50 |
| 3,962,911 | 6/1976 | Grenlund | 73/88.5 |
| 4,118,871 | 10/1978 | Kirkham | 33/172 |
| 4,119,948 | 10/1978 | Ward et al. | 340/151 |
| 4,130,941 | 12/1978 | Amsbury | 33/174 L |
| 4,150,284 | 4/1979 | Trenkler et al. | 250/199 |
| 4,153,998 | 5/1979 | McMustry | 33/143 L |
| 4,197,530 | 4/1980 | Laue | 340/602 |
| 4,222,880 | 9/1980 | Baur et al. | 455/617 |
| 4,259,746 | 3/1981 | Sandstedt | 455/600 |
| 4,328,623 | 5/1982 | Juengel et al. | 33/174 L |
| 4,330,870 | 5/1982 | Arends | 455/617 |
| 4,339,714 | 7/1982 | Ellis | 324/206 |
| 4,401,945 | 8/1983 | Juengel | 340/652 X |
| 4,434,510 | 2/1984 | Lemelson | 455/603 |
| 4,437,240 | 3/1984 | Juengel et al. | 33/172 |
| 4,509,266 | 4/1985 | Cusack | 340/686 |
| 4,550,418 | 10/1985 | Deis | 33/556 X |
| 4,578,874 | 4/1986 | Juengel | 340/652 |
| 4,608,714 | 8/1986 | Juengel | 455/603 |
| 4,658,509 | 4/1987 | Juengel | 33/558 |
| 4,693,110 | 9/1987 | Juengel | 33/558 X |

FOREIGN PATENT DOCUMENTS

| 1128132 | 7/1982 | Canada . | |
| 413808 | 6/1980 | Sweden . | |
| 2007355 | 5/1979 | United Kingdom | 33/174 L |

OTHER PUBLICATIONS

Optically Coupled Probe Performance Specification #ROS 13, "Issue 6", D. Collingwood, 10-19-81.
"Data-Input Link Goes Infrared for Process-Control Applications", Electronics, Dec. 20, 1979, pp. 60 and 62.
Renishaw Brochure, "Optical Transmission for Touch Trigger Probes".
LP2 Probe System Trade Literature; 2 pgs.; Renishaw Electrical Limited.
Prototype Performance Specification Number ROS 13—Optically Coupled Probe (OMP/OMM); 24 pgs.; Renishaw Electrical Limited.
B1G Zero—Senser Trade Literature; 6 pgs.; Catalog No. 1982.

(List continued on next page.)

Primary Examiner—William R. Briggs
Attorney, Agent, or Firm—Harness, Dickey & Pierce

[57] ABSTRACT

Various techniques are disclosed for controlling the operation of a workpiece inspection procedure using a battery operated probe to contact the workpiece and transmit information back to a controller in a machine tool system. In one embodiment, battery power is applied to the probe transmission circuitry in response to a flash of infrared radiation. In another embodiment, the probe is turned on by touching the probe against a reference surface. In both embodiments, a timer is provided to automatically disconnect the batteries after a predetermined time period. In such manner battery life is prolonged.

18 Claims, 7 Drawing Sheets

U.S. PATENT DOCUMENTS

"Rechnergefuhrte Qualitatssicherung in der Industriellen Produktion", (Computer-Controlled Quality Assurance in Industrial Production), Paper believed to be given on May 9–10, 1979, in Karlsruhe, W. Germany.

"Accuracy All the Time-Cost Reduction Through Automatic Gaging of Parts", Gildemeister Report Intern 15, Oct. 1979.

Marposs brochure entitled "Messgerat fur CNC-Drehmaschinen ("Gaging Unit for CNC Turning Machines"), 1979.

"Maschinenintegrierte Mebsteuerung fur NC-Drehmaschinen", (Machine-Integrated Dimensional Control for NC Turning Machines), 2/1980.

Armbruster et al., "Mebsteuerungen fur CNC-Drehmaschinen", (Dimensional Controllers for CNC Turning Machines), 1980.

*MeBeinrichtungen zum Prufen der Werkstuckmabe an Bearbeitungszentren*, by Herbert G. Babic and English translation thereof entitled *Measuring Devices for Inspection of Work Piece Dimensions in Machining Centers*.

"User's Handbook MP3 Probe with 360° Optical Transmission System", from Renishaw.

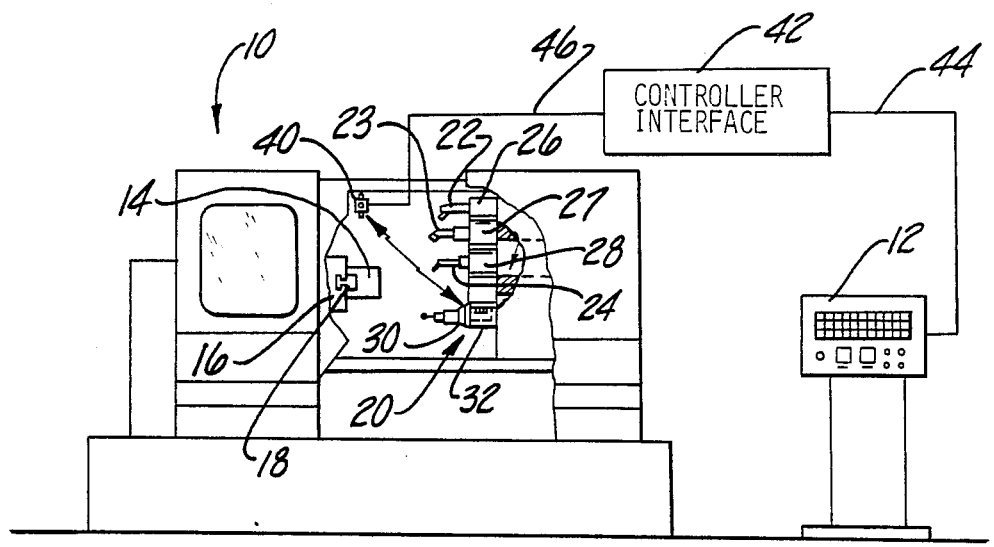
Fig-1
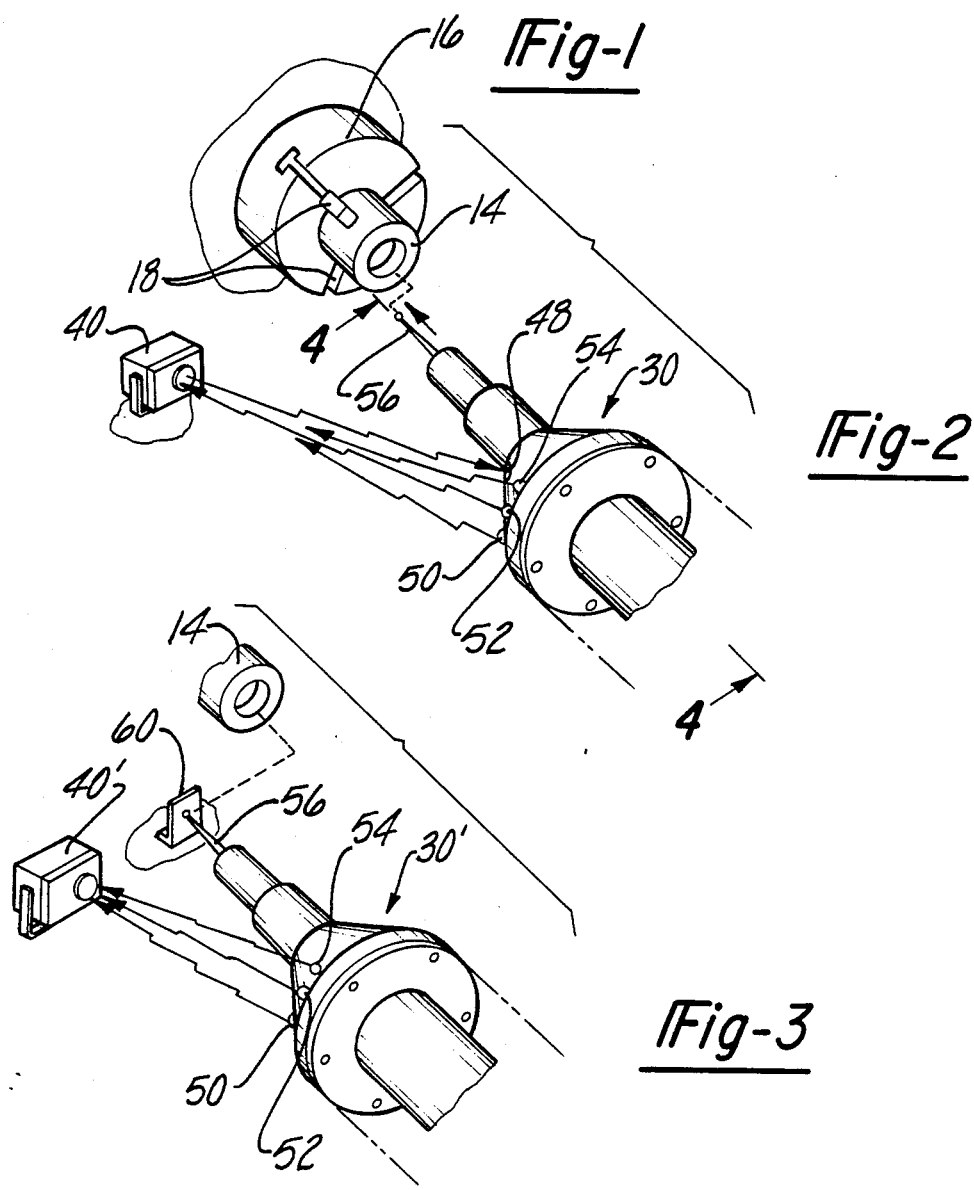
Fig-2
Fig-3

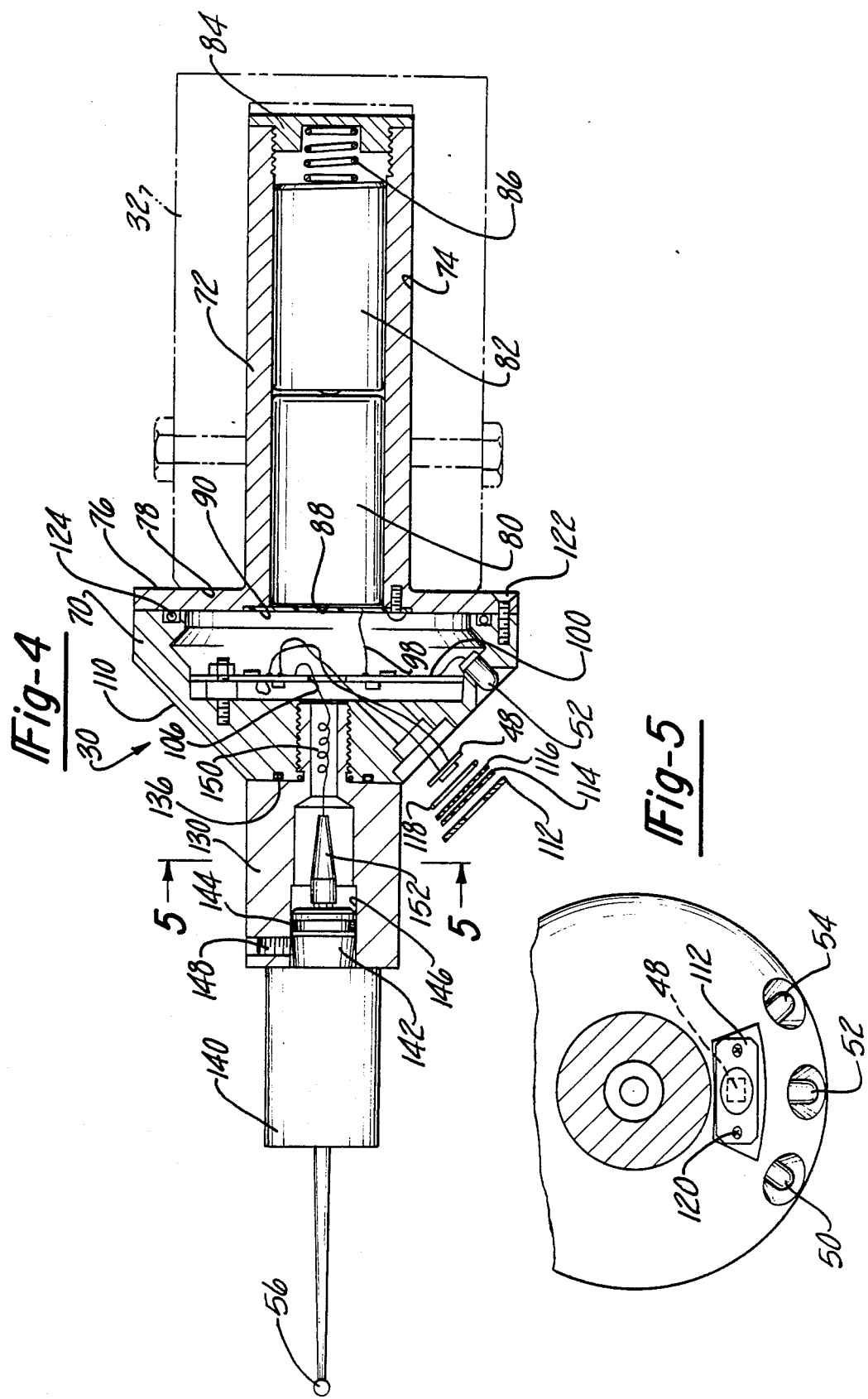

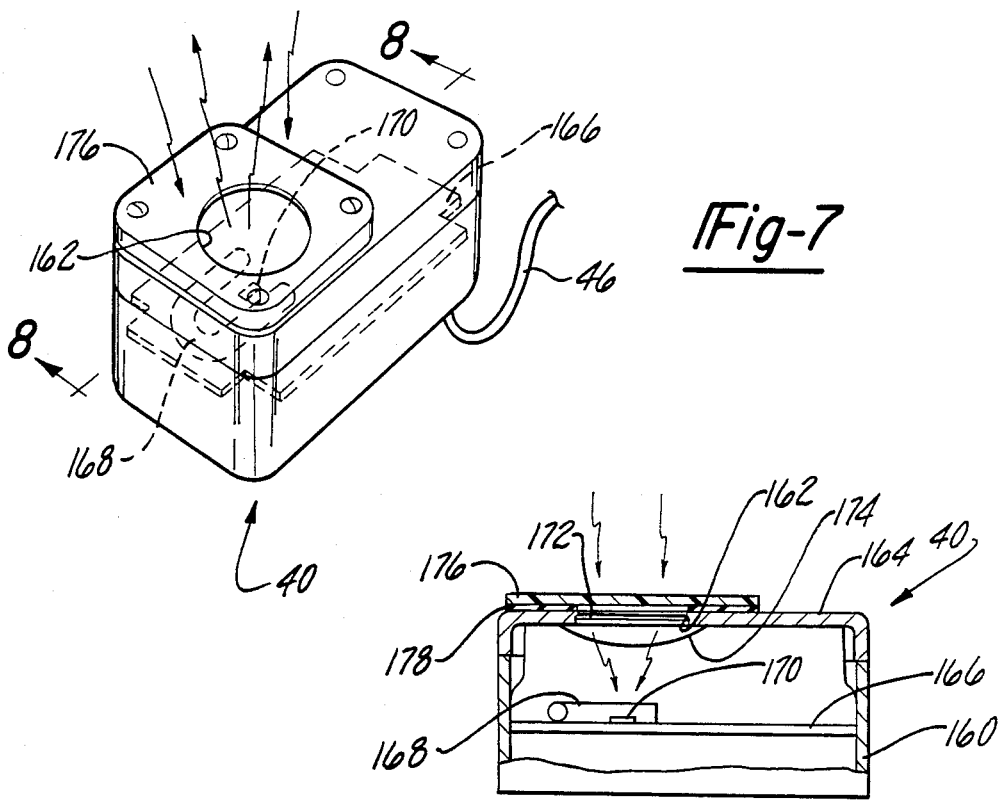
Fig-7
Fig-8
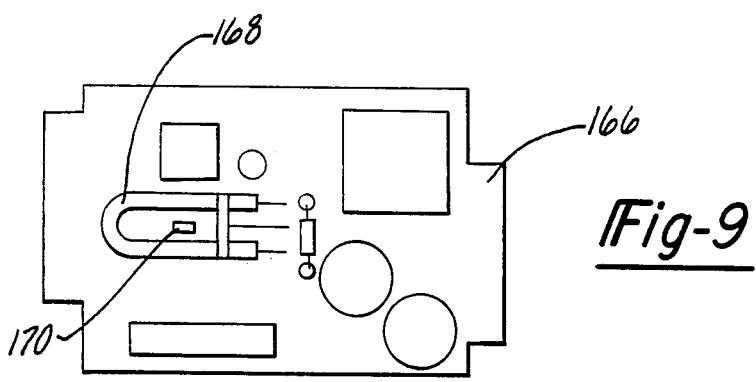
Fig-9

METHOD AND APPARATUS FOR PERFORMING WORKPIECE INSPECTION WITH A PROBE

CROSS REFERENCE TO RELATED APPLICATIONS

This is a continuation of U.S. patent application Ser. No. 504,137, filed June 14, 1983, entitled, "Method and Apparatus for Performing Workpiece Inspection with a Probe", now abandoned, which is a continuation-in-part application of U.S. Ser. No. 414,734, filed Sept. 3, 1982, now U.S. Pat. No. 4,545,106 entitled "Machine System Using Infrared Telemetering", and U.S. Ser. No. 478,906, filed Mar. 25, 1983, now U.S. Pat. No. 4,578,874 entitled "Apparatus For Detecting The Position of A Probe Relative To A Workpiece", both of which are continuation-in-part applications of U.S. Ser. No. 259,257, filed Apr. 30, 1981 entitled "Apparatus For Detecting The Position Of A Probe Relative To A Workpiece", now U.S. Pat. No. 4,401,945 all of which are assigned to the assignee of the present invention.

TECHNICAL FIELD

This invention generally relates to workpiece inspection systems and, more particularly, to the use of probes in automated machine tools to contact the workpiece and provide information relating thereto.

BACKGROUND ART

Automated machine tool systems require a precise means of locating surfaces on workpieces. One of the most common methods is to have the machine move a probe into contact with the workpiece and to record the probe position when contact is made. Probes of this type are known as touch probes. They generally include a stylus for contacting the workpiece and circuitry which operates to generate an electrical signal when the stylus contacts the part. The machine controller can calculate information about the shape or location of the part from the X, Y and Z axes positional data of the probe when the stylus contact generates the electrical signal.

One of the problems encountered with the use of many of these types of probing systems is in the method by which the signal indicating contact by the probe is transmitted back to the controller. It is often impractical to rely on conventional wiring to carry the signal since the wires may interfere with normal machining operations.

The patent literature discloses several probe designs which are adapted to be used in an automatic machining center where the probes are temporarily stored in a tool magazine and are connected and removed from the spindle by an automatic tool changer mechanism. Representative examples of patents disclosing these probes include U.S. Pat. No. 4,339,714 to Ellis; U.S. Pat. No. 4,118,871 to Kirkham; and U.S. patent application Ser. No. 259,257 entitled "Apparatus For Detecting The Position Of A Probe Relative To A Workpiece", filed Apr. 30, 1981 by Juengel, now U.S. Pat. No. 4,401,945 which is assigned to the assignee of the present invention.

The Kirkham approach is disadvantageous because its radio frequency signals are susceptible to electromagnetic interference and must be used within a relatively short transmission distance between the probe and a receiver. Among the problems with the probe system of the Ellis patent is that great care must be taken to align the probe and a specially constructed detector on the spindle head in order for the reactive coupling therebetween to operate properly. The infrared transmission approach disclosed in the Juengel patent is far more advantageous. However, it does require that the probe, in most circumstances, contain its own power source.

It has also been proposed to use touch probes in turning centers such as lathes, as well as in machining centers. Turning centers differ from machining or milling centers in that the workpiece is rotated instead of the tool. In most turning centers, the tool holders are mounted at spaced locations about a turret which operates to selectively advance one of the tools towards the workpiece to perform work thereon. In general, tools for performing outer dimension work on the workpiece are mounted in slots within the turret whereas inner diameter tools such as boring bars are held in an adapter mounted to the turret.

Touch probes used in turning centers have a somewhat different set of problems to overcome than probe used in machining centers, although the method of transmitting the probe signal back to the controller remains a common concern. One of the problems unique to turning center application is that the probes remain fixed to the turret even when not in use unlike the situation with the machining centers where the probes are inserted in the spindle only when they are needed to be used. Consequently, it is not possible to rely on the probe insertion operation to activate the electronic circuitry therein.

One prior touch probe technique for turning centers utilizes inductive transmission modules to transmit the probe signal through the turret to the controller. See, e.g., LP2 Probe System literature of Renishaw Electrical Limited. Unfortunately, this technique requires a substantial modification of the turret in order to utilize the system. Consequently, this approach does not lend itself to be easily used in existing machines without requiring the expense and machine down time to perform the retrofitting operation.

Also related to this invention, although less directly, is that prior art concerned with wireless transmission of dimensional gauging data such as disclosed in U.S. Pat. No. 3,670,243 to Fougere; U.S. Pat. No. 4,130,941 to Amsbury and U.S. Pat. No. 4,328,623, to Juengel et al.

DISCLOSURE OF THE INVENTION

The present invention is directed to apparatus and a method of performing workpiece probing operations in a manner so as to prolong the life of the power sources used in these types of probes. According to one embodiment of the present invention the probe is provided with a detector that serves to connect the power source to the probe signal transmission circuitry when the detector receives a given signal. Means are provided remotely located from the probe for generating this "turn on" signal and wirelessly transmitting it to the detector in the probe. This signal is generated prior to anticipated use of the probe to inspect the workpiece and may be initiated by the controller in an automated machine tool. Later, the power source is disconnected. Power is thus drained from the source only when necessary. This approach is especially advantageous when the probes are used in turning centers where they remain fixed to the turret even though not always used for inspecting operations. However, the broad concepts of this invention have applicability in a wide variety of other probing and machine tool system applications.

In the preferred embodiment, the machine controller initiates a flash of infrared radiation from a head mounted at a convenient location on the machine. As a result, the probe transmission circuitry is enabled and generates an IR signal of a given frequency to indicate that the probe is operating properly and ready for use. The controller then proceeds with the inspection operation. When the probe stylus contacts the workpiece, the frequency of the IR transmission shifts. This shift in frequency is remotely detected and used by the controller to derive useful information about of the workpiece. The probe circuitry preferably includes a timer which shuts off power to the circuit components after a predetermined time period has elapsed from the initial power up cycle or stylus contact.

Advantageously, the head may serve the dual purpose of transmitting the flash turn on signal and receiving the IR radiation from the probe. The head includes an internally contained optical flash device and a photodetector. An outer face of the head housing preferably includes a lens with an IR filter. The IR filter serves to filter out light in the visible spectrum from the flash during probe turn on procedure. The lens operates to focus the IR radiation from the probe onto the photodetector in the head.

In an alternative embodiment, power to the probe circuitry is initially applied when the stylus contacts a reference surface. In operation, the machine moves the probe so that the stylus contacts the reference surface to initialize the power up cycle. The probe is then used to inspect the workpiece, with the probe operating to transmit signals relating thereto back to a remote receiver head.

BRIEF DESCRIPTION OF THE DRAWINGS

These and various other advantages of the present invention will become apparent to one skilled in the art upon reading the following specification and by reference to the drawings in which:

FIG. 1 is an environmental view showing a probing system made in accordance with the teachings of this invention in use with an automated machine tool;

FIG. 2 is a perspective view illustrating the use of a probing system utilizing a flash turn on technique according to one embodiment of this invention;

FIG. 3 is a perspective view illustrating the use of a probing system with a touch turn on technique according to an alternative embodiment;

FIG. 4 illustrates a cross sectional view along the lines 4—4 of FIG. 2 of a probe construction according to one embodiment of this invention;

FIG. 5 is a cross-sectional view along the lines 5—5 of FIG. 4;

FIG. 7 is a perspective view of a flash/receiver head used in one embodiment of this invention;

FIG. 8 is a cross sectional view along the lines 8—8 of FIG. 7;

FIG. 9 is a top plan view of a circuit board used in the flash/receiver head of FIG. 7;

DESCRIPTION OF THE PREFERRED EMBODIMENTS

I. Overview

Figure 6:
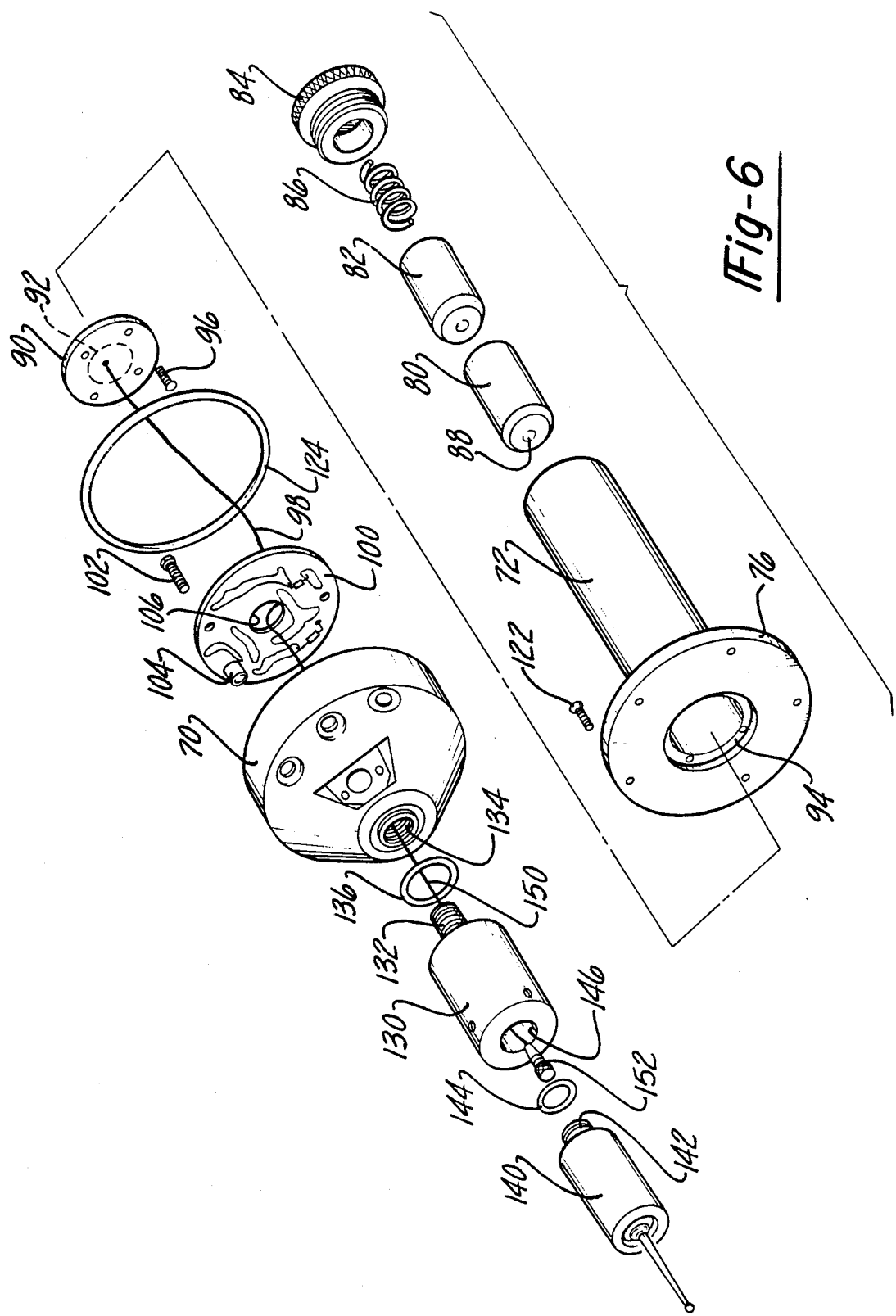
FIG. 6 is an exploded perspective view of the probe shown in FIG. 4.

FIG. 1 illustrates, in simplified form, a typical machine tool system utilizing various aspects of the inventive features to be described. A numerically controlled turning center 10 is shown therein together with a controller 12 for automatically controlling turning operations on a workpiece 14 according to programmed instructions. Turning center 10 typically includes a rotating chuck 16 with jaws 18 thereon for holding the workpiece 14. Mounted to a turret 20 are a plurality of tools 22-24 for performing work on the inner diameter (ID) of workpiece 14. Typically, ID tools of this sort include an elongated shank portion which are held in place in turret 20 by way of adapters 26-28. In accordance with the present invention, a workpiece inspection probe 30 is mounted to turret 20 in the same manner as tools 22-24. In this embodiment, probe 30 is mounted to turret 20 by way of adapter 32 which is identical to adapters 26-28.

As is known in the art, controller 12, among other things, operates to rotate turret 20 to bring the desired tool into the appropriate work position and then moves turret 20 until the tool contacts the workpiece and performs its desired machining operation thereon. Probe 30, on the other hand, is used to inspect the workpiece 14. In this specific example, probe 30 is known in the industry as a touch probe in that it generates an output signal when the probe stylus contacts a surface of the workpiece or other object. Suitable resolvers, digitizers or the like are used to provided signals to controller 12 indicating the position of the probe 30. Consequently, when the signal from probe 30 indicates contact with the workpiece controller 12, can derive useful information about workpiece dimensions, appropriate positioning thereof within the chuck, etc.

A. Flash Turn On

Probe 30 contains its own battery power source for supplying energy to its signal transmission circuitry. Batteries, unfortunately, have limited useful lives. Thus, there is a real need for some means of preserving battery life as long as possible. This is especially true for smaller sized probes used in turning centers. Smaller probes are also restricted in the size of the batteries they can use and thus conservation of energy is very important.

One aspect of this invention provides two way optical communication between probe 30 and a flash-/receiver head 40. Head 40 is connected to controller 12 through an interface 42. When controller 12 determines that it is time to use probe 30 for a probing operation it generates a signal over line 44 to interface 42, which in turn generates a control signal on line 46 to cause head 40 to transmit a given optical signal to probe 30. In the preferred embodiment, this optical signal is a high intensity flash of infrared radiation. This flash is sensed by a suitable detector 48 in probe 30 (see FIG. 2). The flash causes detector 48 to couple the battery power to the probe transmission circuitry. Preferably, probe 30 responds to the flash by transmitting IR radiation at a given frequency back to head 40 via light emitting diodes (LED's) 50-54. This IR radiation is received by head 40 which, in turn, supplies a signal to controller 12 via interface 42 indicating that the probe 30 is operating properly and ready to perform its inspection operation.

Controller 12 then causes turret 20 to advance probe 30 until the stylus 56 contacts workpiece 14. Probe 30 responds to stylus contact by creating a shift in the frequency of the IR radiation transmitted by LED's 50-54. The shift in frequency is detected by interface 42 and communicated to controller 12. The workpiece inspection operation continues as desired, with probe 30 transmitting frequency shifted IR radiation to head 40 every time the stylus makes contact.

Probe 30 includes timing means therein which will disconnect the battery supply from the transmission circuitry after a predetermined period of time. This time period begins when battery power is initially applied to the circuitry and is reset every time the stylus contacts the workpiece. Thus, after the probing operation is finished the time period will eventually lapse and the battery power is disconnected from the transmission circuitry. Accordingly, the battery power is only used during periods of anticipated probe usage. Whenever the probe is not in use the battery power is disconnected and thus, conserves energy prolonging periods between battery replacement.

B. Touch Turn On

FIG. 3 illustrates an alternative method of prolonging battery life. In this example, battery power is first connected to the probe transmission circuitry by touching the probe stylus 56 against any known reference surface 60. Reference surface 60 can be any fixed point within machine 10 whose location is known by controller 12. Probe contact with surface 60 couples the batteries to the probe transmission circuitry and initiates the transmission from LED's 50-54 to head 40'. Head 40' is like head 40 previously described except that it does not need the flash means therein, nor does probe 30' require the photodetector 48. Otherwise, the two embodiments operate substantially identically. After initialization, the probe is moved into position for inspecting workpiece 14, with probe 30' transmitting frequency shifted signals to head 40' whenever stylus contact is made. After a predetermined period of time from the last stylus contact, the batteries are disconnected from the probe transmission circuit.

II. Probe Construction

FIGS. 4-6 illustrate in more detail the construction of probe 30. The probe housing is characterized by a generally cone-shaped middle portion 70 and a rearwardly projecting shank or cylindrical portion 72 of reduced cross-sectional diameter. In this specific embodiment, cylindrical portion 72 is hollow measuring about 4 and ¼ inches in length, with an outer diameter of about 1.4 inches.

The outer dimensions of cylindrical portion 72 are chosen to generally correspond with the dimensions of the bodies or shanks of tools 22-24. Consequently, probe 30 may be used in place of one of the tools in turret 20 and held in adapter 32 in the same manner. As shown most clearly in FIG. 4, this may be accomplished by sliding cylindrical portion 72 into the pocket 74 of adapter 32 until the rear wall 76 of housing portion 70 abuts the front face 78 of adapter 32. This procedure thereby insures that the tip of stylus 56 is spaced at a known position with turret 20. Consequently, controller 12 may accurately rely upon the position of the stylus 56 during the probe inspection operation. Of course, other conventional means may be used to position stylus tip 56 at the appropriate spacing. For example, some machine tool systems utilize a set screw (not shown) or other means within the rear of pocket 74 to adjust the stylus spacing.

Cylindrical portion 72 advantageously serves the dual purpose of providing a battery compartment as well as to provide an easy to use mounting member. The elongated cylindrical shape of portion 72 enables the use of long life "cylindrical" batteries resembling typical flashlight batteries in shape for powering the probe transmission circuitry. Preferably, two "C" cell lithium batteries 80, 82 are employed. The ability to use cylindrical batteries, instead of smaller batteries such as button or disc cells, provides the probe with an exceedingly long operational life at low cost.

Batteries 80, 82 are slid into the interior of portion 72. A spring loaded cap 84 is then threaded onto the end of portion 72, with spring 86 urging the positive or male terminal 88 against board 90. The lower surface of board 90 includes a circular conductive layer 92. Board 90 is secured within a well 94 in an interior surface of wall 76 by way of screws 96. An insulated lead 98 makes electrical connection with conductive layer 92 by way of a plated through hole in board 90. The opposite end of lead 98 is connected to circuit board 100 containing the probe circuitry. A description of the electrical schematic for the circuitry will be described later herein. Circuit board 100 is generally circular in shape containing electrical components mounted on both sides thereof. Circuit board 100 is mounted within the interior of middle portion 70 by way of suitable fasteners 102 passing through standoffs 104. The board 100 also includes a centrally located aperture 106 therein through which various leads can pass to facilitate connection to the appropriate areas of circuit board 100.

Photodetector 48 and its associated subassembly is mounted in the outer sloping surface 110 of middle housing portion 70. Photodetector 48, in this particular example, is a PIN diode such as part No. DP104 available from Telefunken. Photodetector 48 fits within a countersunk bore and is held in place by way of a bezel 112 having a window therein. Interposed between bezel 112 and photodetector 48 are layers of transparent plastic 114, an infrared filter layer 116 and an O-ring 118. Suitable fasteners 120 sandwich all of these components into a subassembly mounted within the countersunk bore. The leads from photodetector 48 pass through aperture 106 and are connected to suitable points on circuit board 100.

LED's 50-54 are mounted adjacent to photodetector 48. LEDs 50-54 are designed to emit optical signals in the infrared radiation band, i.e. light which is not normally visible to the human eye. LED's 50-54 may comprise, for example, component Nos. OP290 available from TRW, Inc. It should be noted at this point that the arrangement of LED's 50-54 and photodetector 48, taken together with the configuration of the sloping probe surface to which they are mounted combine to optimize several important advantages. For example, by mounting LED's 50-54 onto the sloping surface 110 of the probe, the infrared radiation that is emitted thereby is directed forwardly of turret 20 at angles at which the radiation may be easily picked up by various locations of head 40. The probe construction enables the user to rotate the probe into a position where the LED's 50-54 and photodetector 48 are pointing in the general direction of head 40. Thus, it is not necessary to mount head 40 at any absolute spatial location relative to probe 30 giving the system great flexibility for use in different machine tool systems. Reliable optical communication between probe 30 and head 40 is thereby obtained while at the same time minimizing the number of light emitting devices within probe 30. By keeping the number of light emitting devices to a minimum the energy drain from the batteries is kept as small as possible, thereby further prolonging battery life.

Rounding out the assembly of middle portion 70, the wall 76 is affixed to rearward portions of portion 70 by way of suitable fasteners 122. O-rings, such as ring 124, are advantageously used to seal the interior of the probe 30 from the somewhat adverse conditions that the probe may encounter during use in the machine tool system.

An annular nosepiece 130 includes a threaded male member 132 which mates with threads formed in a bore 134 in the front face of middle housing portion 70. O-ring 136 is again employed for sealing purposes. Nosepiece 130 may be made in various lengths to increase or decrease the relative spacing of stylus tip 56 as may be desired. Due to the threaded fastening engagement with the middle housing portion 70, a variety of such nosepieces can be made and interchanged with one another for use in different applications.

A switch unit 140 is removably attached to nosepiece 130. Switch unit 140 includes a circular whistle notch end construction 142 including a surrounding O-ring 146 which is press fit into the internal passageway 146 within nosepiece 130. One or more set screws 148 extending orthogonally through nosepiece 130 clamps the switch unit 140 in place. Switch unit 140 can be a variety of constructions that operate to open or break one or more electrical contacts therein when stylus 56 is moved from its rest position. Those skilled in the art are aware of a variety of constructions that fulfill this general purpose. One suitable switch construction is disclosed in detail in U.S. Ser. No. 388,187, filed June 14, 1982, by Robert F. Cusack, now U.S. Pat. No. 4,451,987 and assigned to the assignee of the present invention. Ths patent is hereby incorporated by reference. Briefly, this construction employs a wobble plate with three equally spaced ball contacts thereon. The wobble plate is spring biased so that the balls are normally pressed against three corresponding electrically conductive inserts. The three ball-insert pairs serve as switches (referred to later herein as switches S1-S3) and are connected together in series. The wobble plate is connected to stylus 56. Whenever stylus 56 moves, the wobble plate tilts and lifts one of the ball contacts from its corresponding insert thereby breaking the electrical connection therebetween.

The three switches in unit 140 are connected to circuitry on board 100 by way of cable 150. The other end of cable 150 includes a miniature coax connector 152 or other suitable connector that mates with a connector on the end of replaceable switch unit 140. Those skilled in the art appreciate that these types of switch units are very sensitive and may need to be replaced. The construction of the present invention enables such replacement to be made quickly and easily.

Various shapes and sizes of styli may be used in connection with probe 30. For example, instead of the straight stylus 56 shown in the drawings, a stylus may be used in which the tip thereof is offset from the major longitudinal axis of probe 30. The various styli are interchangeable with switch unit 140 and may be attached thereto by the use of suitable fastening means such as set screws.

III. Flash Turn On

A. Flash/Receiver Head

The mechanical details of flash/receiver head 40 are shown most clearly in FIGS. 7-9. Head 40 employs a generally rectangular container 160 having an opening 162 formed in a front face 164 thereof. One or more circuit boards 166 are mounted within container 160. Circuit board 166 includes a variety of electrical components thereon for carrying out the functions to be described later in detail. Two of the most important components are shown in these drawings. They are xenon flash tube 168 and photodetector 170. As noted before, the purpose of flash tube 168 is to generate a high intensity light pulse of short time duration to initiate probe operation. Xenon is preferred because it generates light that is rich in infrared radiation. In the preferred embodiment, flash tube 168 is a part No. BUB 0641 xenon flash tube available from Siemens. It is capable of generating a flash or light pulse lasting about 50 microseconds with an intensity of 100 watt/seconds. Other types of suitable light sources, of course, can be employed.

Although not absolutely necessary, the visible light generated by flash tube 168 is preferably eliminated so as not to distract the operator or others in the shop where machine tool 10 is being used. To this end, an infrared filter 172 covering opening 162 is employed. IR filter 172 serves to block out visible light but passes infrared radiation therethrough generated by flash tube 168.

The purpose of photodetector 170, on the other hand, is to detect infrared radiation transmitted by probe 30. In this embodiment, photodetector 170 is a PIN diode and operates in a similar manner as photodetector 48 in probe 30. A convex lens 174 is advantageously used in opening 162 to concentrate the IR radiation from probe 30 onto photodetector 170 which is located at the focal point of lens 174. Rounding out the construction of head 40, there is supplied a transparent face plate 176. Face plate 176 covers opening 162 and is suitably attached to front face 164 having a gasket 178 sandwiched therebetween.

B. Flash/Receiver Head Circuitry

Figure 10:
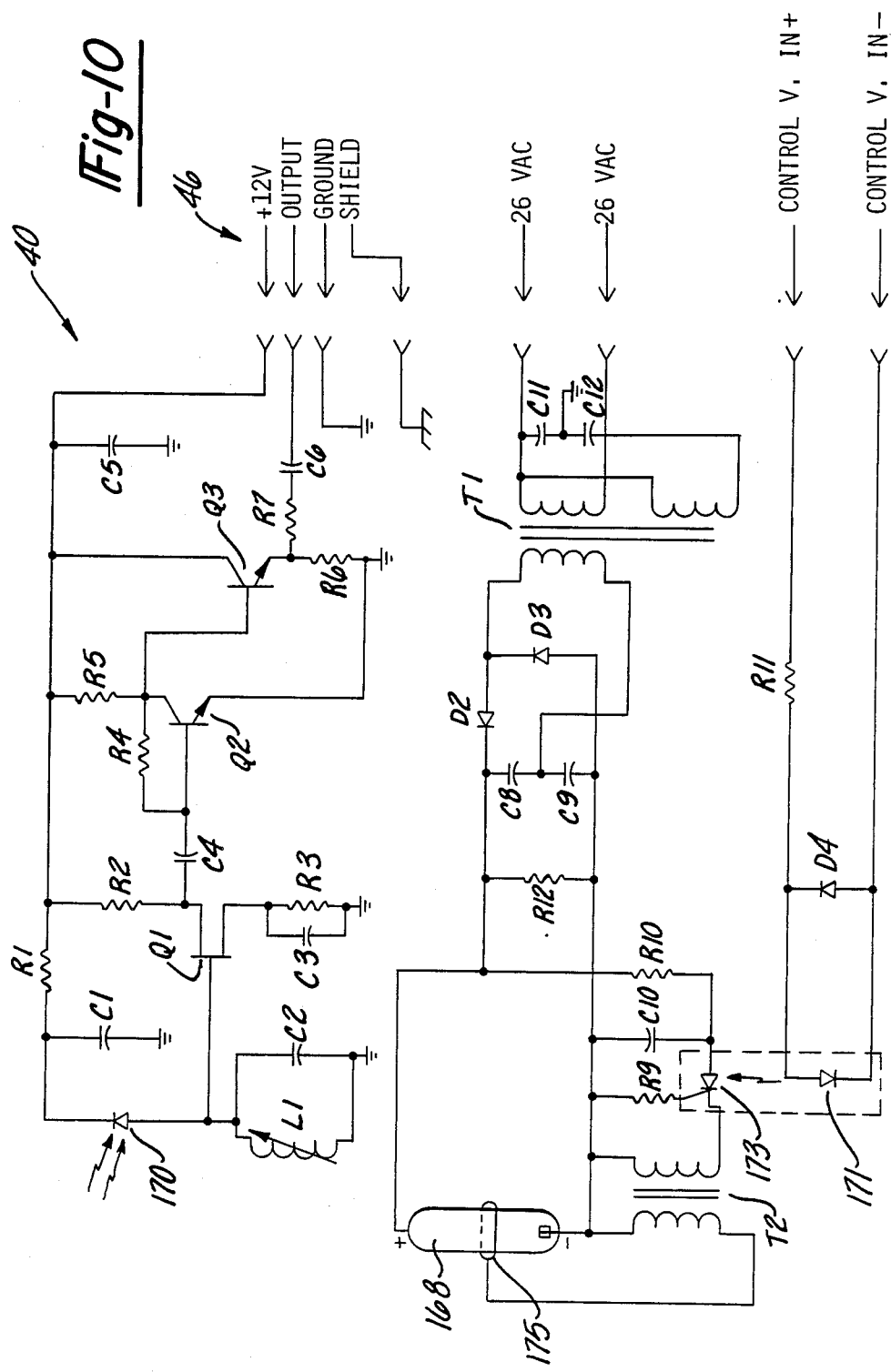
FIG. 10 is a schematic diagram of circuitry used in the flash/receiver head.

FIG. 10 illustrates the circuitry used in the flash-/receiver head 40 of the preferred embodiment. As noted before, head 40 is coupled to interface 42 over one or more conductor lines generally indicated by the reference numeral 46.

A 26 volt alternating current (AC) signal is applied to the primary of step up transformer T1. Energy from transformer T1 is stored across capacitors C8 and C9 which are, in turn, coupled across the positive and negative electrodes of xenon flash tube 168. In this embodiment, capacitors C8 and C9 store about 250-300 volts DC when fully charged.

To cause tube 168 to flash, controller 12 via interface 42 generates an appropriate signal level on the lines labeled "control" to cause LED 171 to conduct and emit light. LED 171 is part of an optical isolation package containing silicon controlled rectifier (SCR) 173. SCR 173 is connected in a series circuit with the primary of transformer T2 and capacitor C10. Capacitor C10, like capacitor C8 and C9 is charged due to the action of transformer T1. When LED 171 is activated, SCR 173 conducts and dumps the charge of capacitor C10 across the primary of transformer T2. This charge is stepped up to about 4,000 volts by transformer T2 whose secondary is connected to the trigger electrode 175 of flash tube 168. Trigger electrode 175 is capacitively coupled to tube 168 and the high voltage thereon is sufficient to ionize the gas within the tube. The ionized gas is sufficiently conductive to permit the energy from capacitors C8 and C9 to discharge across the positive and negative electrodes to create a very high intensity flash of short duration. After tube 168 flashes the capacitors begin to recharge until such time as another flash initiating control signal is supplied from interface 42.

The probe 30 responds to the flash by transmitting the IR signal which is picked up by the photodetector 170 in head 40. Photodetector 170 is coupled to a tuned tank circuit comprising variable inductor L1 and capacitor C2. By the way of a specific example, probe 30 will generate IR radiation pulsed at a frequency of about 150 kilohertz until the probe stylus contacts an object at which time the frequency will shift to about 138 kilohertz. The tank circuit in head 40 is tuned to approximately the average of these two frequencies so that the head circuitry can detect either one of these probe frequencies but will filter out extraneous frequencies outside a preselected range or band width.

The remaining circuitry in FIG. 10 is used to amplify the detected signal transmitted from probe 30 which is coupled over the "output" line to interface 42. Briefly, the head amplification circuitry employs a field effect transistor Q1 whose high input impedance matches that of the tuned circuit so as to avoid loading problems. Transistor Q2 in cooperation with transistor Q1 amplifies the received signal and couples it to an emitter follower network employing transistor Q3. The amplified signal is coupled to interface 42 over the output line through DC filter capacitor C6 and resister R7 coupled to the emitter of transistor Q3.

Interface 42 has circuitry therein that operates to detect these selected probe signal frequencies and will generate outputs to controller 12 in response thereto. A first signal is generated to indicate that the probe is operating properly and a second signal is generated when the probe stylus contacts an object. Suitable circuitry for detecting the frequency shift is disclosed in U.S. Ser. No. 414,734, filed Sept. 3, 1982 entitled "Machine System Using Infrared Telemetering" by Juengel now U.S. Pat. No. 4,545,106 and assigned to the assignee of the present invention. This patent is hereby incorporated by reference. Briefly, such circuitry employs a phase locked loop circuit to perform a frequency shift keying operation on the received signals and activates relays upon detection of either of the selected frequencies. However, a variety of other methods of detecting the probe signals is within the skill of the ordinary practitioner.

C. Probe Circuitry

Figure 11:
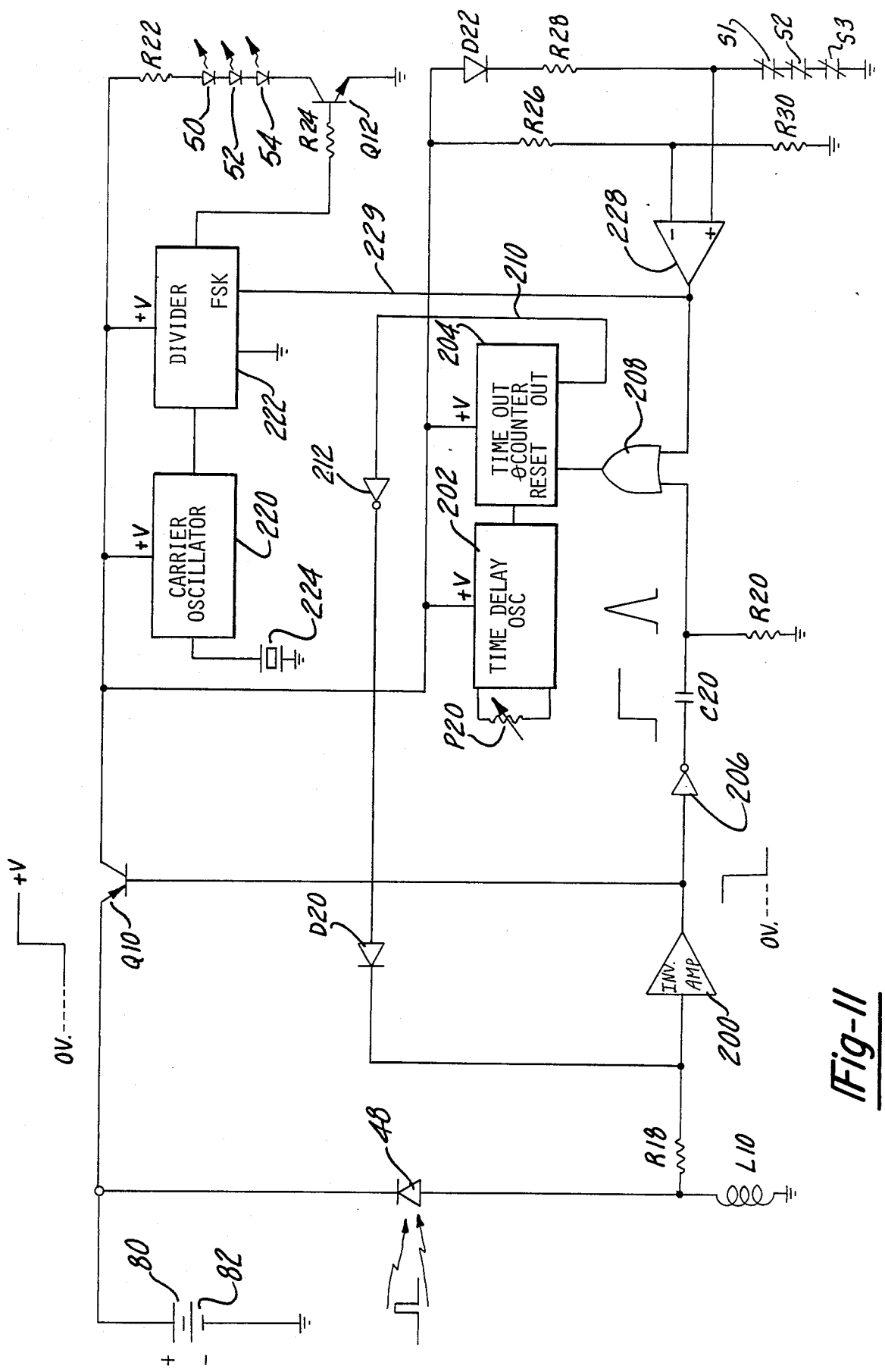
FIG. 11 is a schematic diagram of circuitry used in the probe of one embodiment of this invention that utilizes the flash turn on technique.

FIG. 11 is an electrical schematic diagram of the circuitry within probe 30. PNP transistor Q10 operates as a switch to selectively connect or disconnect power from batteries 80, 82 to the components used to generate IR radiation from LED's 50-54. Transistor Q10 is normally in a nonconducting state and thus, the batteries 80, 82 effectively see an open circuit so that energy is not drained from the batteries. However, when head 40 generates its flash of IR radiation, photodetector 48 conducts current from the batteries through inductor L10 for the duration of the flash.

The very fast rise time associated with the light pulse from the xenon flash tube provides a unique signal which can be easily discriminated from other light sources in the area of the machine tool. The IR filter at the head 40 excludes most of the visible spectrum so that the flash cannot be seen and become an aggravation to nearby persons. When the fast rise time light pulse reaches the photodetector 48, it is converted to an electrical pulse across the inductor coil L10. The coil L10 serves as a high pass filter and excludes steady state or low frequency light pulses such as flourescent lights in the area may produce.

The surge of current through photodetector 48 during the flash creates a "ringing" phenomenon in inductor L10 as is known in the art. This ringing phenomenon is basically a damped oscillation that lasts approximately 500 microseconds in response to the flash light pulse of about 50 microseconds. The oscillations from inductor L10 are amplified and inverted by inverting amplifier 200. The output of amplifier 200 is connected to the base of transistor Q10. The momentary ringing in inductor L10 caused by the flash creates a forward bias across the base-emitter junction of transistor Q10 and causes it to conduct. The conduction of transistor Q10 connects the power from batteries 80, 82 to the power inputs of the circuit components labled +V in the drawings. When power is applied to oscillator 202 it begins supplying pulses to a time out counter 204. Counter 204 is reset to initialize its time out period when the flash is received from head 40. This is accomplished by way of an inverter 206 which inverts the output of amplifer 200 to a positive signal which is shaped by the RC time constant of capacitor C20 and resistor R20 into a pulse. This pulse is connected to the reset input of counter 204 through OR gate means 208. As will appear, time out counter 204 is also reset whenever the probe stylus 56 contacts an object reflected by the opening of one of switches S1–S3.

Time out counter 204 is designed so that it will provide a logical low signal on its output line 210 as long as it is counting, i.e. not timed out. The logical low signal on line 210 is inverted by inverter 212 which, in turn, is connected through diode D20 to the input of amplifier 200. As a result, the output of amplifier 200 is latched to a low state thereby keeping transistor Q10 in a conductive state providing power to the circuit components until such time as counter 204 times out. The time out period for counter 204 is chosen to be of sufficient length to allow the controller 12 to begin the actual inspection process with the probe stylus contacting the workpiece. In general, a time period of several minutes is sufficient for this purpose. The time out period may be adjusted by way of potentiometer P20 defining the oscillation frequency for time delay oscillator 202. Higher frequency oscillations from oscillator 202 cause counter 204 to count faster and thus, time out in a shorter time, and vice versa. The generation of various time delays is, of course, well within the skill of the ordinary practitioner.

Carrier oscillator 220 and divider 222 cooperate to define the frequency at which LEDs 50-54 transmit their IR radiation back to head 40. Conventionally, oscillator 220 uses a crystal 224 having a known resonant frequency as a master clock. Oscillator 220 operates to shape the oscillations from crystal 224 into a form suitable for providing clock pulses to a conventional digital divider such as divider 222. Divider 222 serves as a convenient means for shifting the frequency transmitted by LEDs 50-54 when the probe stylus contacts an object. In this particular example, divider 222 operates to divide 1.8 MHz pulses from carrier oscillator 220 by the number 12 and thus provides at its output signal frequencies of about 150 KHz. The output of divider 222 is coupled to a driver transistor Q12 or other suitable circuitry for driving LEDs 50-54 at the frequency defined by the divider output. Thus, in this example, when head 40 initiates the flash turn on sequence, probe 30 responds by starting the transmission of IR radiation at a given frequency. The probe transmission is detected by photodetector 170 in head 40 which, in turn, supplies an indication to controller 12 that the probe 30 is operating properly and is ready to initiate the probing sequence. If probe 30 does not respond in such manner suitable precautionary measures can be taken.

When the probe stylus 56 contacts an object, one of the three switches S1-S3 in switch unit 140 will open. The opening of one of the switches S1-S3 causes two things to happen. First, it resets time out counter 204 to the beginning of its time out sequence. Secondly, it creates a shift in the frequency transmitted by LEDs 50-54. This may be accomplished in a variety of manner. However, in the preferred embodiment, the opening of one of the switches S1-S3 causes comparator 228 to go high. The output of comparator 228 is coupled to the reset input of counter 204 through OR gate 208 and thus, resets the counter. In addition, the output of comparator 228 is coupled to a frequency shift keying input of divider 222 over line 229 to cause it to divide the clock pulses from carrier oscillator 220 by a different number, here by the number 13. The outut signals from divider 222 thereby changed in frequency to about 138 KHz. Thus, the frequency of the IR radiation transmitted by LEDs 50-54 is shifted in comparison to the frequency transmitted when the probe was initially turned on. This shift of frequency is detected by photodetector 170 and transmitted to controller 12 to indicate stylus contact with an object, normally a workpiece surface. Controller 12, by knowing the position of stylus 56 when this signal is received, can accurately calculate the dimensions of the workpiece or derive other useful information.

Controller 12 may move the probe 30 to contact other workpiece surfaces, each time the probe responding by a shift in IR radiation transmitted from the probe. The timeout period of timeout counter 204 is chosen so that it is longer than the time that would elapse between stylus contacts. When the probing operation is completed, controller 12 may go forward with other machining operations as may be desired. There is no need to generate any further signals to turn off the probe since energy from the batteries will be automatically disconnected once counter 204 times out. In such case, its output line 210 would go high ultimately resulting in the reverse biasing of the base-emitter junction of transistor Q10. This places transistor Q10 in a non-conducting state. In this manner the only drain on the batteries 80, 82 is the leakage current of the semiconductors and the photocurrent of photodetector 48. Typically, this current can be very small, often less than 300 microamps. Consequently, the more power demanding components are disconnected from the battery supply until actually needed for anticipated probe use. Preferably these components are made from CMOS semiconductor technology to even further conserve drain on the batteries when used.

By way of a nonlimited example, carrier oscillator 220 is formed by a crystal controlled transistor Component No. 2N2222, divider 222 is an LM4526 available from National Semiconductor, time delay oscillator 202 is formed from one half of an integrated circuit LM2903 available from National Semiconductor, and time out counter 204 is an LM4040 also available from National Semiconductor.

IV. TOUCH TURN ON

Figure 12:
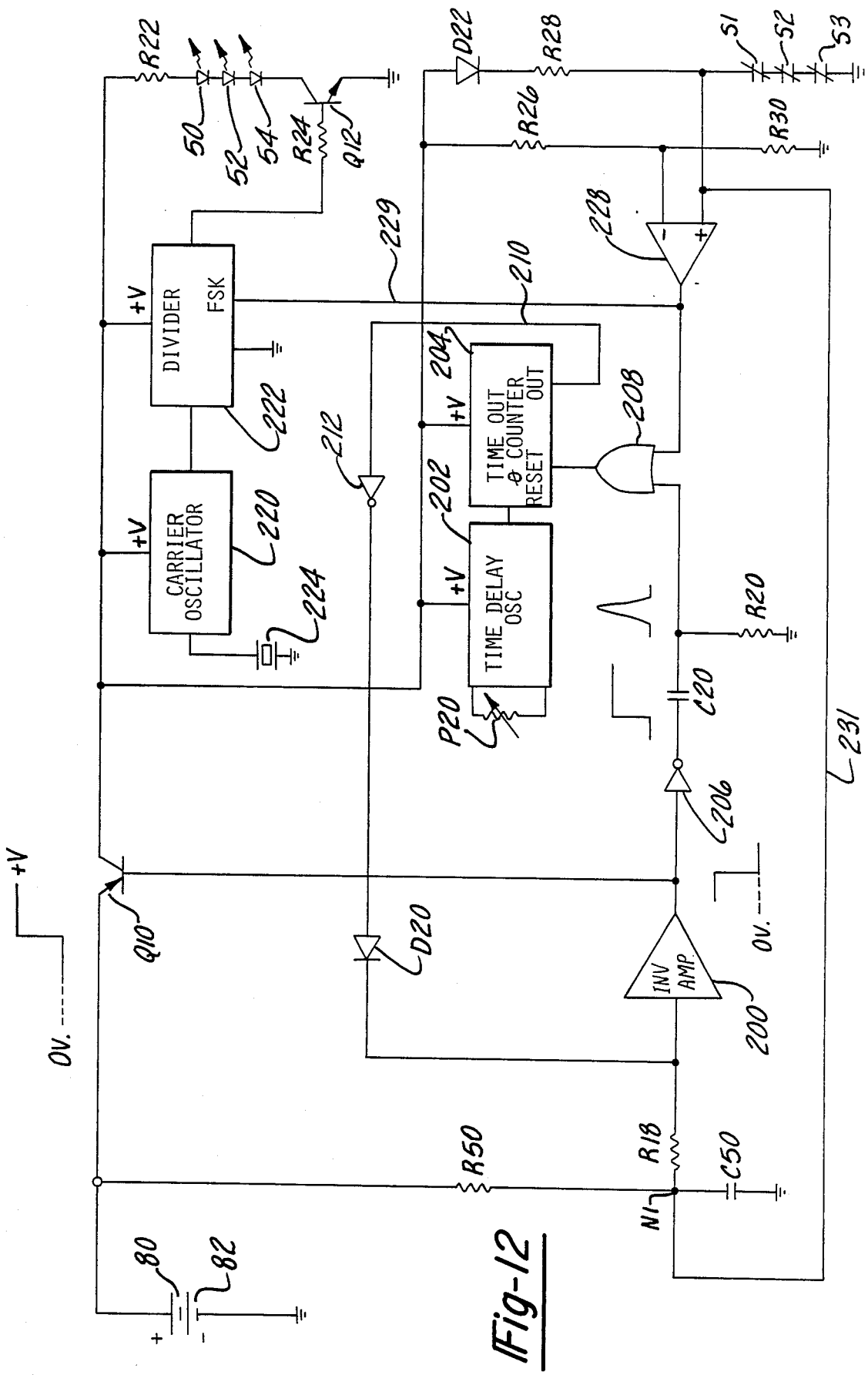
FIG. 12 is a schematic diagram of circuitry used in a probe utilizing the touch turn on technique.

The touch turn on technique previously described in connection with FIG. 3 may be used as an alternative to the flash turn on technique described in section III. Both techniques have the same general objective, i.e. to conserve battery life. To a large extent the probe construction and circuitry for both techniques are similar. A schematic diagram of the probe circuitry for the touch turn on technique is shown in FIG. 12. This circuitry is like that of FIG. 11 and thus, common reference numerals will be used to reference common components.

A comparison of the two figures will reveal that the major difference is the deletion of photodetector 48 and associated inductor coil L10 in favor of resistor R50 and capacitor C50. This circuit also differs in that it includes a line 231 connected between the probe switches S1-S3 and node N1 coupled to the input of inverting amplifier 200. Transistor Q10 is kept in a nonconducting state until such time as one of the switches S1-S3 opens as a result of the stylus 56 contacting reference surface 60 (FIG. 3). This is because the switches S1-S3 keep the input to amplifier 200 at substantially ground level as long as they are closed; i.e. when the probe stylus is not contacting anything. However, when stylus 56 contacts the reference surface 60 one of the switches S1-S3 opens and causes capacitor C50 to begin charging. Preferably, the values of resistors R50 and R18 as well as capacitor C50 are chosen to provide an RC time constant that delays the time at which capacitor C50 is charged to a voltage sufficient to turn on transistor Q10 after being inverted by amplifier 200. This requires that the controller 12 hold the probe stylus 56 against the reference surface 60 for a definite period of time, for example, about a second. This procedure will insure that accidental bumps against the probe stylus or other extraneous factors such as electrical noise will not erroneously trigger activation of the probe.

Once capacitor C50 has been sufficiently charged the transistor Q10 will turn on and supply power from batteries 80, 82 to the probe transmission components. The counter 204 will be reset and supply its output signal over line 210 to latch the transistor Q10 in its conducting state. In this embodiment, the divider will initially generate the lower of the two output frequencies due to the tripping of comparator 228 while the probe stylus 56 is contacting the reference surface. The controller 12, however, can be suitably programmed to consider this initial probe signal as an indicator that the probe has properly turned on and is ready to proceed with inspecting the workpiece.

Controller 12, knowing that the probe 30' is operating properly, then moves onto the workpiece inspection procedure with the stylus 56 contacting various workpiece surfaces. Once the stylus 56 is moved away from the reference surface 60 the switches S1-S3 close causing divider 222 to drive the LED's 50-54 at the other frequency. As soon as the stylus contacts a workpiece surface, one of the switches S1-S3 opens again tripping comparator 228. This results in the resetting of counter 204. The tripping of comparator 228 also provides an output over line 229 to divider 222 to cause its output and therefore the outputs of LED's 50-54 to shift in frequency. This procedure continues until such time as the workpiece inspection procedure is finished, with the battery supply being automatically disconnected from the probe circuitry once timer 204 times out.

SUMMARY

From reading the foregoing specification, those skilled in the art will come to appreciate that it discloses several significant advances in the workpiece inspection art. Each of the embodiments have been described in connection with the best mode that is currently contemplated for carrying out their inventive techniques. No attempt, however, has been made to list all of the various alternatives or modifications to the general concepts thereof. Such modifications or impovements should become apparent to the skilled practitioner after a study of the drawings, specification and claims. For example, it should be apparent that the flash turn on or touch turn on techniques can be used with different types of probes other than the one specifically illustrated. Therefore, while this invention has been described in connection with a particular example thereof, its true scope should be measured in light of the following claims and equivalents thereto.

I claim:

1. Apparatus for use in a machine tool system, said apparatus comprising:
    first means including a probe for sensing information about a workpiece, said first means including circuit means for transmitting information relating to the workpiece to a remote receiver, a power source, and detector means operative to connect power from the source to the circuit to enable operation thereof upon receipt of a given signal;
    second means remotely located from the first means for wirelessly transmitting the given signal to the detector means to thereby initiate the supply of power to the circuit;
    said second means including a flash tube and tube activation means for energizing said tube to create said given signal in the form of a flash of light having an intensity of substantially 100 watt-seconds and a duration of substantially 50 microseconds; and
    said detector means including photodetector means having an electrical characteristic responsive to light, and said detector means further including filter means coupled to the photodetector means for rendering said detector means responsive to said flash to cause connection of power from the source to the circuit to enable operation thereof while rendering the detector means essentially unresponsive to other light sources which may be located in the area of the probe;
    whereby power drain from the source is minimized by selectively using energy therefrom only during periods of anticipated use.

2. The apparatus of claim 1 wherein said circuit means includes timer means for discontinuing the supply of power from the source to the circuit after a predetermined period of time.

3. The apparatus of claim 2 wherein said predetermined period of time is measured from the time at which power from the source is initially supplied to the circuit or an indication that the first means has undergone a sensing operation.

4. Apparatus for use in a machine tool system to detect contact with a workpiece, said apparatus comprising:
    probe means including a stylus for contacting the workpiece, circuit means for wirelessly transmitting information associated with stylus contact to a remote receiver, a battery power source, and detector means operative to connect power from the battery to the circuit to enable operation thereof upon receipt of a given optical signal;
    first means remotely located from the probe for transmitting the given optical signal to the detector means in the probe prior to anticipated usage thereof whereby power drain from the battery is minimized;
    said first means including a flash tube having ionizable gas therein, flash tube activation means for energizing said flash tube, said flash tube activation means including capacitive storage means coupled to the flash tube, transformer means for charging said capacitive storage means, and trigger means for transferring sufficient voltage from the capacitive storage means to ionize the gas in the flash tube, and said first means further including infrared optical filter means for blocking visible light from the flash tube whereby activation of said flash tube generates said given optical signal in the form of a high intensity flash of infrared light of short duration; and
    said detection means including photodetector means having an electrical characteristic responsive to light, said detector means further including electrical filter means coupled to the photodetector means for rendering said detector means responsive to said flash to cause connection of said battery power to said circuit while rendering said detector means substantially unresponsive to other light sources which may be located in the area of the probe.

5. The apparatus of claim 4 wherein said probe circuit includes a timer that discontinues the supply of power from the battery after a predetermined period of time has elapsed from the generation of the given signal or stylus contact with the workpiece.

6. In a probe for detecting information about a workpiece, said probe having at least one optical transmitting device for transmitting information to remote receiver, electrical components for driving said optical device, and at least one battery for supplying energy to the components, wherein the improvement comprises:
    input circuit means containing a photodetector and an inductor coupled to the battery, operative to generate an output signal of a given amplitude in response to a remotely generated flash of light from a flash tube and including means to provide said photodetector to be substantially unresponsive to other light sources which may be located in the area of the probe, and switch means responsive to the output signal for connecting energy from the battery to the electrical components to thereby enable optical transmission of the information to the remote receiver, said switch means comprising a transistor which switches to its conductive state upon receipt of the given output signal generated by the photodetector and inductor.

7. The appartatus of claim 4 wherein said probe further includes:
    optical transmission means connected to said circuit means, operative to transmit infrared signals indicating stylus contact with the workpiece.

8. The apparatus of claim 7 wherein said first means further comprises:
a housing having said flash tube therein, a photodetector for receiving signals from the probe, and said infrared optical filter means being located in an opening in a wall of the housing.

9. The apparatus of claim 8 wherein said housing further includes a lens for focusing IR radiation from the probe onto the photodetector.

10. The apparatus of claim 7 wherein said probe circuit is operative to generate a given frequency for driving the optical transmission means when power from the battery is first applied, and for shifting the frequency when the stylus contacts the workpiece.

11. A method of using a battery powered probe in a machine tool system, said method comprising:
using a flash tube to generate an optical signal in the form of a high intensity flash of light prior to anticipated usage of the probe, said flash having an intensity of substantially 100 watt-seconds and a duration of substantially 50 microseconds;
filtering visible light from the flash and transmitting it to the probe;
employing circuitry in the probe that will provide a given output signal in response to said flash while being substantially unresponsive to other light sources which may be located in the area of the probe; and
using said output signal to couple power from the battery to electrical components within the probe for a period of time sufficient to enable the probe to perform desired operations on a workpiece.

12. The method of claim 11 which further comprises the steps of:
transmitting an optical signal of a given frequency from the probe when power from the battery is initially supplied to the circuit components; and
shifting the frequency of said transmitted optical signal when the probe contacts the workpiece.

13. The method of claim 11 which further comprises the step of:
discontinuing the supply of power from the battery to the circuit components after a predetermined period of time has elapsed from the detection of said optical signal or probe contact with the workpiece.

14. A probe for detecting information about a workpiece, said probe comprising:
circuit means for wirelessly transmitting information about the workpiece to a remote receiver; a battery power source; a transistor between the battery and circuit means; and detector means operative to generate a pulse to the transistor to bias it into a conducting state to initiate the supply of power from the battery to the circuit means to enable operation thereof upon receipt of a high intensity flash of infrared radiation generated from a flash tube, said detector means including photodetector means having an electrical characteristic responsive to light; and filter means coupled to the photodetector means for rendering said detector means responsive to said flash to cause connection of battery power to the circuit means while rendering said detector means substantially unresponsive to other light sources which may be located in the area of the probe, said probe further including timer means enabled by the pulse to generate output signals for a given time period, said output signals being used to latch the transistor into said conducting state to thereby maintain power to the circuit until the timer means times out.

15. The probe of claim 14 wherein said filter means comprises an inductor coupled to said photodetector means.

16. The improvement of claim 6 which further comprises:
timer means for generating a latching signal to keep the switch means in a given state to thereby maintain battery connection for a predetermined period of time;
first means for detecting when the probe contacts an object;
second means for generating at least two different frequencies for driving said optical transmitting device; and
said first means being connected to the timer means and second means, operative to reset the timer and create a shift in frequency when the probe contacts an object.

17. The improvement of claim 6 wherein the remotely generated flash of light is infrared radiation provided by the energization of said flash tube and filtration of visible light therefrom.

18. The improvement of claim 6 which further comprises latching means including a timer that provides output signals to maintain the transistor in its conductive state for a given period of time after the receipt of the remotely generated flash of light; and
wherein the improvement further comprises circuit means for driving said optical transmitting device, and means coupled to the timer and circuit means for resetting the timer and causing a change in characteristics of the signal emitted by said optical transmitting device when the probe contacts an object.

* * * * *